R. DUDLEY & L. RUDE.
TORSION SPRINGS FOR HARVESTER.

No. 172,615. Patented Jan. 25, 1876.

Witnesses:
Edwin James.
John K. Jones.

Inventors
Richard Dudley
and
Lee Rude.
per J. E. I. Holmead,
Attorney.

UNITED STATES PATENT OFFICE.

RICHARD DUDLEY, OF ERIE, PENNSYLVANIA, AND LEE RUDE, OF ALBION, ILLINOIS; SAID RUDE ASSIGNOR TO SAID DUDLEY.

IMPROVEMENT IN TORSION-SPRINGS FOR HARVESTERS.

Specification forming part of Letters Patent No. 172,615, dated January 25, 1876; application filed November 6, 1875.

*To all whom it may concern:*

Be it known that we, RICHARD DUDLEY, of the city and county of Erie, and State of Pennsylvania, and LEE RUDE, of Albion, in the county of Edwards and State of Illinois, have invented certain Improvements in the Employment of Torsion-Springs on Harvesters, Mowers, &c., of which the following is a full, clear, and exact description, reference being had to the accompanying drawing, and the letters of reference marked thereon, making a part of this specification, in which—

Figure 1:
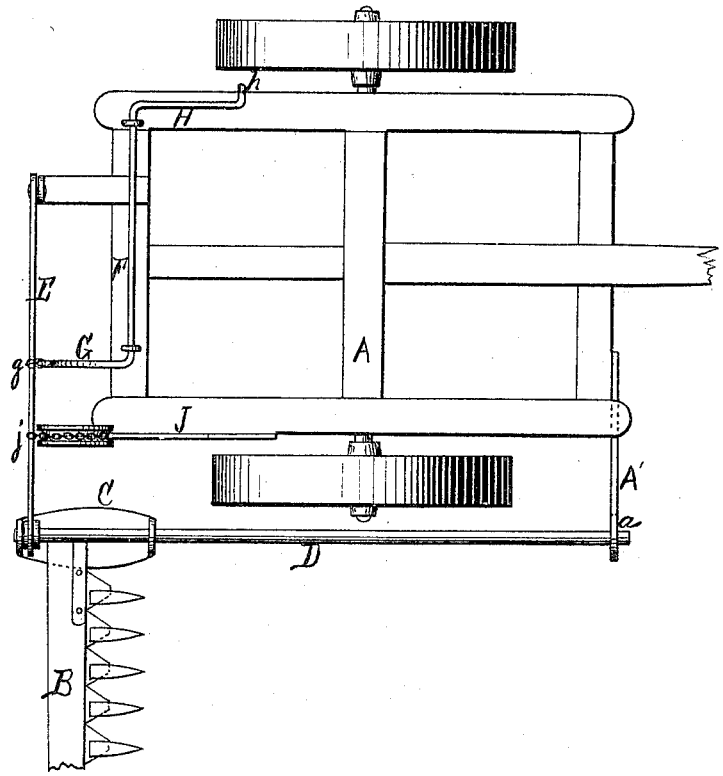
Figure 2:
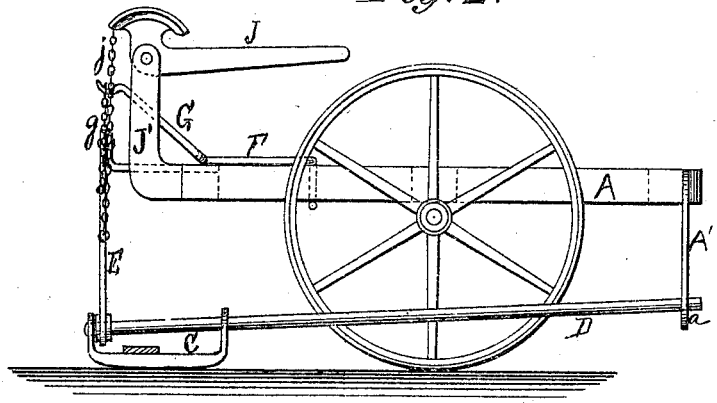

Figure 1 is a top-plan view. Fig. 2 is a side elevation.

Our present invention is an improvement in harvesting and mowing machines; and has as its chief object to relieve the animals while drawing the machine from unnecessary draft, and steadying the cutter-bar by the intense sensitiveness of its spring-bearing in passing over stubble-fields, ruts, stones, or any other obstruction. To accomplish this our invention consists in the application of a pure torsion-spring—that is, a spring having a long torsional arm, and provided with a lateral lever-arm, which, when elevated or depressed, shall so twist or wrench the long torsional arm as to cause the elasticity of the spring to be not only developed, but to be developed in a manner so sensitive that should the cutter-bar meet with any obstruction it will instantly be raised until the obstruction is overcome. Our invention also consists in attaching the lever-arm or support that holds the cutter-bar to the lateral lever-arm of the torsion-spring by chain, swivel, or equivalent device, so as to render the same not only adjustable, but purely automatic in operation, as hereinafter fully explained. Our invention also consists in attaching to the lever-arm or support that holds the cutter-bar to a treadle or hand-lever, which the operator controls, in such manner as also to render its bearing adjustable, so that the bearings of the lateral lever-arm of the spring, and those of the treadle or lever can be so relatively adjusted as to act in perfect harmony.

We are aware that springs have heretofore been used, and which were designed to accomplish the same result which we attain by the employment of a pure torsion-spring—that is, a spring consisting of a straight rod rigidly secured at one end, and having a lateral lever-arm projecting at right angles, and also at an angle of inclination from the opposite end of the main or torsional rod, working in a loose bearing, and which, on being pressed against, turns or twists the torsional arm, so as to cause the straight fibers of the steel instantaneously to be so acted on as to cause the elastic power or force of the spring to be brought into play under the most sensitive pressure.

The construction and operation of our invention are as follows:

A is the frame of the machine. B is the cutter-bar, and, by means of the shoe C, is connected with the draft-rod D and lateral brace E in the usual manner, the opposite end of the draft-arm working in the slotted section *a* of the brace-bar A', which is attached to the opposite end of the frame A. These features constitute no part of our invention, as they have all been used before; but their combination with a spring, F, which will be recognized as belonging to the torsional class of springs we will now proceed to describe, and which constitutes our invention. The torsion-spring represented in the drawing consists of a long torsional arm, designated by F, which extends nearly the entire width of the frame, and is secured in position by suitable bearings. This arm F is provided with a lateral lever-arm, G, and a right-angled bearing-support, H, which terminates in a hook or clamp fastening, *h*, all as clearly shown in Fig. 1. J is the ordinary lever, through which the operator or driver is enabled to control the elevation or depression of the cutter-bar, and works on a suitable bearing-bar, J', in the usual manner. This lever J is attached by a chain, *j*, or other suitable device, susceptible of adjustment to the lateral brace E, and which brace E is also connected, by a chain or other suitable device, *g*, to the lateral lever-arm G, as clearly shown in Fig. 2.

All who are familiar with the working of torsion-springs of the class illustrated in the accompanying drawing know that their elasticity or freedom of torsional action depends on the diameter and length of the arm F, and therefore these springs can be so constructed as to regulate their degree of sensitiveness at pleasure. Therefore, in connection with an adjustable connecting device, $g$, connecting the lateral lever-arm G with the supporting-arm E, the machine can not only be adjusted so as to suit any kind of field, but so arranged as to cause the cutter-bar to be raised on meeting with the slightest obstruction through the shoe C and its other connecting mechanism, thus not only leaving the machine under the control of the operator, through the lateral brace E, in elevating and depressing the cutter-bar, but doing more through the sensitiveness of the torsion-spring and its connection with lateral brace, really rendering the elevation of the cutter-bar automatic.

While in the accompanying drawing we have illustrated a peculiar form of torsion-spring, we desire it distinctly understood we do not limit ourselves to any exact form, as many varieties of torsional springs might be substituted to accomplish the same result.

By torsional springs we do not mean coil-springs, nor any other style of spring except those whose torsional action is developed through the twisting or wrenching of a long arm through the action of a short lever-arm.

What we claim as new, and desire to secure by Letters Patent of the United States, is—

1. In combination with the lateral brace E of the cutter-bar B of a harvesting or mowing machine, a torsion-spring and its lateral arm, constructed and arranged substantially as described.

2. The lateral lever-arm G of a torsion-spring, connected with the lateral brace E by means of an adjustable support, so as to permit of its operation, substantially as described.

In testimony whereof we have signed our names to this specification in the presence of two subscribing witnesses.

RICHARD DUDLEY.
LEE RUDE.

Witnesses:
WM. P. HAYES,
W. W. DINSMORE.